A. D. HUNSICKER & W. A. DENTON.
LEVEL.
APPLICATION FILED DEC. 21, 1909.
973,437.
Patented Oct. 18, 1910.
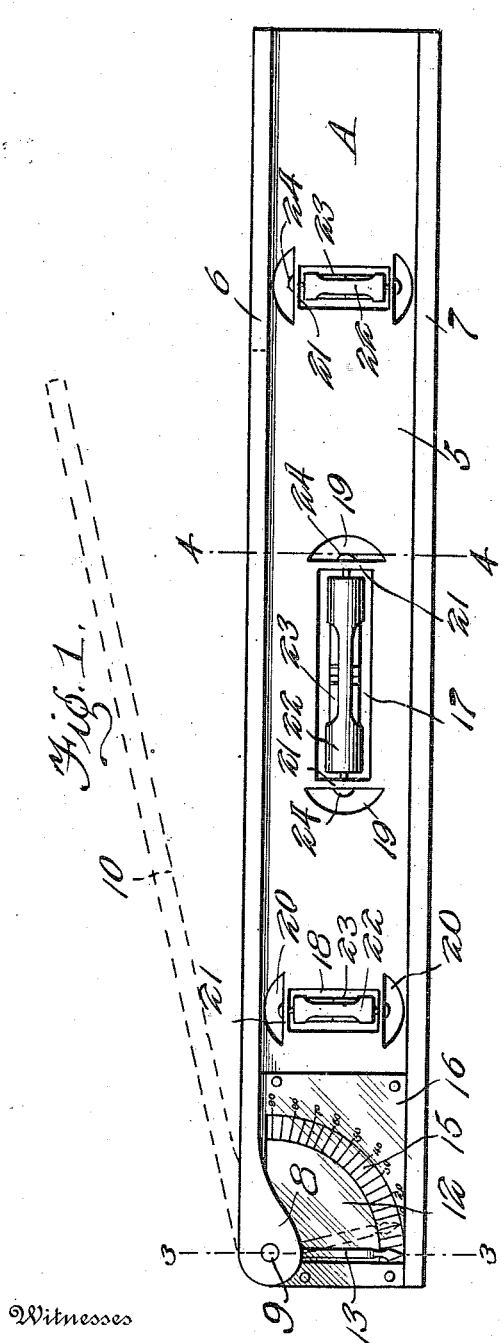
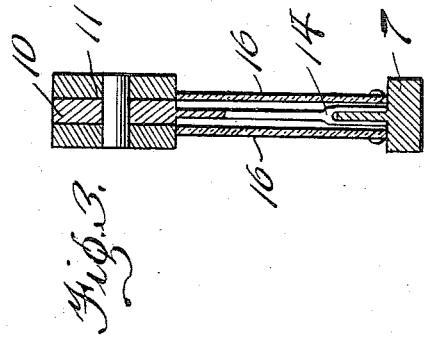
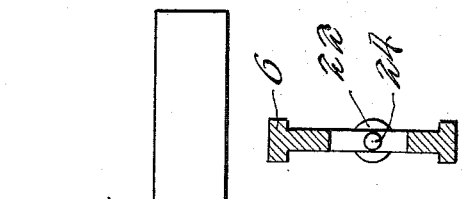
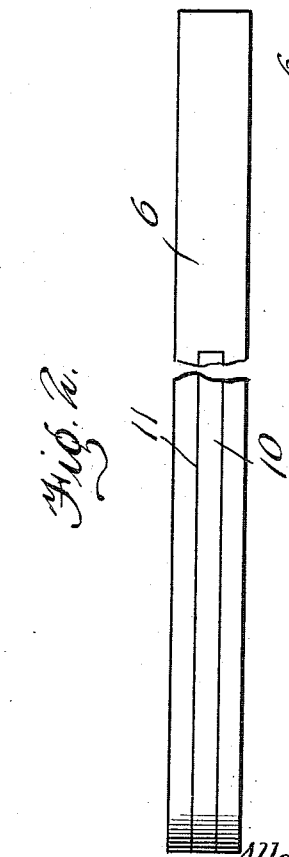
Witnesses
Inventors
Allan D. Hunsicker
William A. Denton
By Victor J. Evans
Attorney

UNITED STATES PATENT OFFICE.

ALLAN D. HUNSICKER AND WILLIAM A. DENTON, OF SHAWNEE, OKLAHOMA.

LEVEL.

973,437. Specification of Letters Patent. Patented Oct. 18, 1910.

Application filed December 21, 1909. Serial No. 534,326.

*To all whom it may concern:*

Be it known that we, ALLAN D. HUNSICKER and WILLIAM A. DENTON, citizens of the United States of America, residing at Shawnee, in the county of Pottawattomie and State of Oklahoma, have invented new and useful Improvements in Levels, of which the following is a specification.

This invention relates to levels for the purpose of determining the exact degree of the angle of any particular surface with reference to the vertical or the horizontal, as the case may be; and it has for its objects to produce an instrument of this kind which shall possess superior advantages in point of simplicity, durability, accuracy and general efficiency.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention; it being, however, understood that no limitation is necessarily made to the precise structural details therein exhibited, but that changes, alterations and modifications within the scope of the invention may be resorted to when desired.

In the drawing,—Figure 1 is a side elevation of a device constructed in accordance with the invention. Fig. 2 is a top plan view. Fig. 3 is a transverse sectional view enlarged taken on the plane indicated by the line 3—3 in Fig. 1. Fig. 4 is a transverse sectional view taken on the plane indicated by the line 4—4 in Fig. 1.

Corresponding parts in the several figures are denoted by like characters of reference.

The body of the improved implement, which is preferably made of metal, such as steel, consists of a bar A which is I-shaped in cross section, being composed of a web portion 5 having top and bottom flanges 6, 7, the former of which is thickened adjacent to one end of the bar, as shown at 8, for the passage of a pin 9 upon which a rule 10 is pivotally supported; said rule being adapted to be folded within a recess 11 in the top flange 6 of the bar so as to lie flush with said top flange when folded. The web of the bar is provided with a sector-shaped opening 12 concentric with the axis of the pivot 9 for the accommodation of a pointer or indicator 13 which is rigidly connected with the rule 10 at right angles to the latter, said pointer being terminally bifurcated, as shown at 14, to straddle the portion of the web 5 adjacent to the opening 12 where scales 15 indicating degrees of a circle are formed in such a manner as to be easily read. A transparent protective covering 16 for the scales and the pointer or indicator is preferably provided upon each side of the implement. The web 5 is provided with a longitudinal aperture 17 and with one or more transverse apertures 18, adjacent to each of which auxiliary openings 19 and 20 are formed, said openings 19 and 20 being separated from the apertures 17 and 18, which are of elongated rectangular shape, by the narrow partition strips 21. The apertures 17 and 18 are for the accommodation of casings 22 containing spirit levels 23, said casings being secured by fastening members 24 inserted through the partition strips 21.

From the foregoing description taken in connection with the drawings the operation and advantages of this invention will be readily understood by those skilled in the art to which it appertains. It is very evident that by placing the rule 10 in engagement with any given surface, the deviation of said surface from the horizontal or the vertical may be readily ascertained by bringing the stock or body A to a true vertical or horizontal position as the case may be, such position being ascertained by the spirit levels, after which the degree of the angle may be read upon the scale 15.

The top and bottom flanges of the stock of the device will protect the spirit levels from injury when the device is laid upon its side, and protection will likewise be afforded to the hand 13 coöperating with the scale 15. It will also be seen that the movement of the hand 13 will be limited by the movement of the rule 10 into the slot constituting a housing for said rule, thus protecting the hand from injury or displacement by contacting with the end wall of the slot in which it moves.

Having thus described the invention, what is claimed as new, is:—

In a device of the character described, a stock consisting of a bar of I-shaped cross section having a top flange thickened at one end and provided with a longitudinal recess, a pin extending through the thickened portion, a rule pivoted upon said pin and accommodated within the recess, the web of the stock being provided adjacent to one end with a sector-shaped recess and the rule being equipped with a pointer terminally forked and straddling the web adjacent to the sector-shaped opening, and spirit levels suitably supported upon the stock.

In testimony whereof we affix our signatures in presence of two witnesses.

ALLAN D. HUNSICKER.
WILLIAM A. DENTON.

Witnesses:
J. F. DICKSON,
W. H. WILLIAMS.